United States Patent
Schröder et al.

(12)
(10) Patent No.: US 6,273,492 B1
(45) Date of Patent: Aug. 14, 2001

(54) OPERATING MECHANISM FOR A FOLDING TOP OF A CONVERTIBLE

(75) Inventors: Hans-Joachim Schröder, Wiesbaden; Jochen Baumert, Frankfurt, both of (DE)

(73) Assignee: Mannesmann VDO AG, Frankfurt (DE)

(*) Notice: Subject to any disclaimer, the term of this patent is extended or adjusted under 35 U.S.C. 154(b) by 0 days.

(21) Appl. No.: 09/389,850

(22) Filed: Sep. 2, 1999

(30) Foreign Application Priority Data

Sep. 16, 1998 (DE) .............................. 198 42 337

(51) Int. Cl.$^7$ ....................................... B60J 7/00
(52) U.S. Cl. ................. 296/107.01; 296/117; 60/431
(58) Field of Search ............... 296/117, 107.17, 296/107.16, 107.01; 60/431, 432, 433

(56) References Cited

U.S. PATENT DOCUMENTS

| 4,296,570 | * | 10/1981 | Balbach et al. | 49/360 |
| 4,910,445 | * | 3/1990 | Borrmann | 318/468 |
| 4,969,388 | * | 11/1990 | Kolhoff et al. | 296/117 |
| 5,110,175 | * | 5/1992 | Fischbach | 296/117 |
| 5,335,926 | * | 8/1994 | Stolle | 296/117 |
| 5,451,849 | * | 9/1995 | Porter et al. | 296/223 |
| 5,706,713 | | 1/1998 | Lim . | |
| 5,724,878 | * | 3/1998 | Stolle et al. | 296/117 |
| 6,114,819 | * | 9/2000 | Porter et al. | 296/223 |

FOREIGN PATENT DOCUMENTS

| 2005666 | 8/1971 | (DE) . |
| 4445944 | 4/1996 | (DE) . |
| 0844125 | 5/1998 | (EP) . |
| 2272541 | 5/1994 | (GB) . |
| 9429137 | 12/1994 | (WO) . |
| 9834868 | 8/1998 | (WO) . |

OTHER PUBLICATIONS

Patent Abstracts of Japan vol. 017, No. 430 (M–1460), Aug. 10, 1993, JP 05 092723 A (Takada Kogyo), Apr. 16, 1993.

* cited by examiner

*Primary Examiner*—D. Glenn Dayoan
*Assistant Examiner*—Lori L. Coletta
(74) *Attorney, Agent, or Firm*—Martin A. Farber

(57) ABSTRACT

An operating mechanism for a folding top (1) of a convertible has an electric motor (10) with a rotational speed that can be regulated for driving a hydraulic gear mechanism (11). A control unit (7) for actuating the electric motor (10) has a memory (18) for rotational speeds intended according to the positions of the folding top (1). As a result, the rotational speeds are stored as software that is easy to change.

12 Claims, 2 Drawing Sheets

OPERATING MECHANISM FOR A FOLDING TOP OF A CONVERTIBLE

FIELD AND BACKGROUND OF THE INVENTION

The invention relates to an operating mechanism for a folding top of a convertible with a hydraulic gear mechanism having a hydraulic pump and hydraulic motors connected in an articulated manner to the folding top, with a position transmitter for generating electric signals according to the position of the folding top and with control electronics for producing the intended sequence of movements of the folding top and for sensing the electric signals of the position transmitter.

Such operating mechanisms are frequently used in modern convertibles and are consequently known. In these cases, the hydraulic motors, usually designed as hydraulic cylinders, are controlled by means of electromagnetically switchable hydraulic valves. The limit switches are arranged at the ends of the range of movement of the folding top and, when the folding top reaches its end position, send a signal to the control electronics. In order to switch the hydraulic valves at the intended positions of the folding top, further limit switches are frequently arranged within the range of movement of the folding top. The speed of the folding top during opening and closing is dictated by the dimensions of the linkages of the folding top and the volumetric flow/delivery characteristic of the hydraulic pump. In these cases, even minor changes to the structural design of the folding top lead to distinct changes in the speed of movement of the folding top.

A disadvantage of the known operating mechanism is that the adaptation of the linkage to the intended speed of movement of the folding top is very complex. Furthermore, the movement of the folding top is very jerky and slow.

SUMMARY OF THE INVENTION

The invention is based on the problem of designing an operating mechanism of the type stated at the beginning in such a way that the movement of the folding top can be adapted to an intended speed with particularly low structural expenditure.

This problem is solved according to the invention by it being possible for a volumetric flow of hydraulic medium of the hydraulic pump or a hydraulic output of the hydraulic medium to be regulated by the control electronics for producing an intended speed of movement of the folding top.

This type of design allows the speed to be continuously adapted in a simple manner during the moving of the folding top by regulating the volumetric flow of the hydraulic pump. Thanks to the invention, the range of movement of the folding top can be subdivided into a plurality of positional ranges by the use of a plurality of limit switches and for a predetermined speed to be set for each positional range by regulating a corresponding volumetric flow. The speed can therefore be changed independently of the dimensions of the linkage. With the operating mechanism according to the invention, moreover, various types of folding top can be actuated. This leads to a very short development time for a new folding top.

The volumetric flow of the hydraulic medium could be regulated, for example, by means of a stepless gear mechanism between the hydraulic pump and an electric motor driving the latter. It would also be conceivable to use a hydraulic pump with a variable displacement volume. The operating mechanism according to the invention requires particularly low structural expenditure, however, and is particularly inexpensive if the rotational speed of an electric motor driving the hydraulic pump can be regulated.

The adaptation of the operating mechanism according to the invention to different types of folding top is particularly inexpensive if the control electronics have a memory for a plurality of rotational speeds or rotational-speed profiles of the electric motor intended for various positions of the folding top. As a result, the rotational speeds and rotational-speed profiles of the electric motor are stored as software and can therefore be easily changed.

A plurality of limit switches advantageously sense the position of the folding top, each range between two limit switches being assigned a constant rotational speed or constant output of the electric motor.

The limit switches serve as interpolation points for the positional detection. In another configuration, the rotational speed of the motor is integrated over time between these interpolation points. Consequently, the position between the interpolation points can be interpolated. Here too, a rotational-speed or PWM setpoint selection is specified for the electric motor according to the position.

It could be considered to use many limit switches to subdivide the overall movement of the folding top into numerous positional ranges and to change the rotational speed of the electric motor respectively in the positional ranges. However, this requires a high number of limit switches. According to another advantageous development of the invention, however, a high number of limit switches can be avoided if the control electronics have means for calculating the position of the folding top at any given instant. In this way, the approximate position of the folding top can be calculated by the control device from the number of revolutions of the electric motor and the average displacement volume of the hydraulic pump. Therefore, only a particularly small number of limit switches are required for interpolation points to calculate the position of the folding top. A further advantage of this type of design is that it is no longer necessary for the folding top to move at a different speed whenever there is a signal from one of the limit switches, but instead the speed can be varied continuously. This type of design makes it possible to avoid jerky movement of the folding top.

According to another advantageous development of the invention, the means for calculating the position of the folding top at any given instant require particularly low structural expenditure if the control electronics are designed for determining the position of the folding top at any given instant from the number of revolutions of the electric motor and the volumetric efficiency of the hydraulic gear mechanism.

It helps to increase further the accuracy in the determination of the position of the folding top if the electric motor senses the angular position or speed of the rotor of the folding top and if the control electronics are designed for calculating the position of the folding top on the basis of the rotor position or rotor speed.

According to another advantageous development of the invention, the position of the folding top at any given instant can be determined particularly accurately by a sensor for sensing an adjusting angle or adjusting displacement of a linkage of the folding top. In this case, the sensor can, like a potentiometer for example, generate an analog signal or scan and count markings on the linkage. This type of design permits virtually any desired changes in speed during moving of the folding top, with a particularly small number of limit switches. A rotational-speed or PWM setpoint selection for the electric motor is specified according to the position.

The operating mechanism according to the invention is particularly inexpensive in the case of DC motors with brushgear if the control electronics are designed for sensing and counting voltage and current peaks. These are produced, for example, by a Hall generator or by commutation of the motor (ripple counting).

In the calculation of the position of the folding top on the basis of the revolutions of the electric motor, the changing of the hydraulic efficiency of the hydraulic gear mechanism leads to errors. According to another advantageous development of the invention, these errors can be kept particularly low by means of sensors for the pressure and temperature of the hydraulic medium.

According to another advantageous development of the invention, the error in the sensing of the position of the folding top can be further reduced with particularly low expenditure if the control electronics have a memory for an average number of revolutions of the electric motor for a movement of the folding top between two limit switches. This has the effect of compensating for influences due to wearing of the hydraulic gear mechanism over time.

BRIEF DESCRIPTION OF THE DRAWINGS

The invention allows numerous embodiments. To illustrate its basic principle further, one of these is described below and is represented in the drawing, in which.

DETAILED DESCRIPTION OF THE PREFERRED EMBODIMENT

Figure 1:
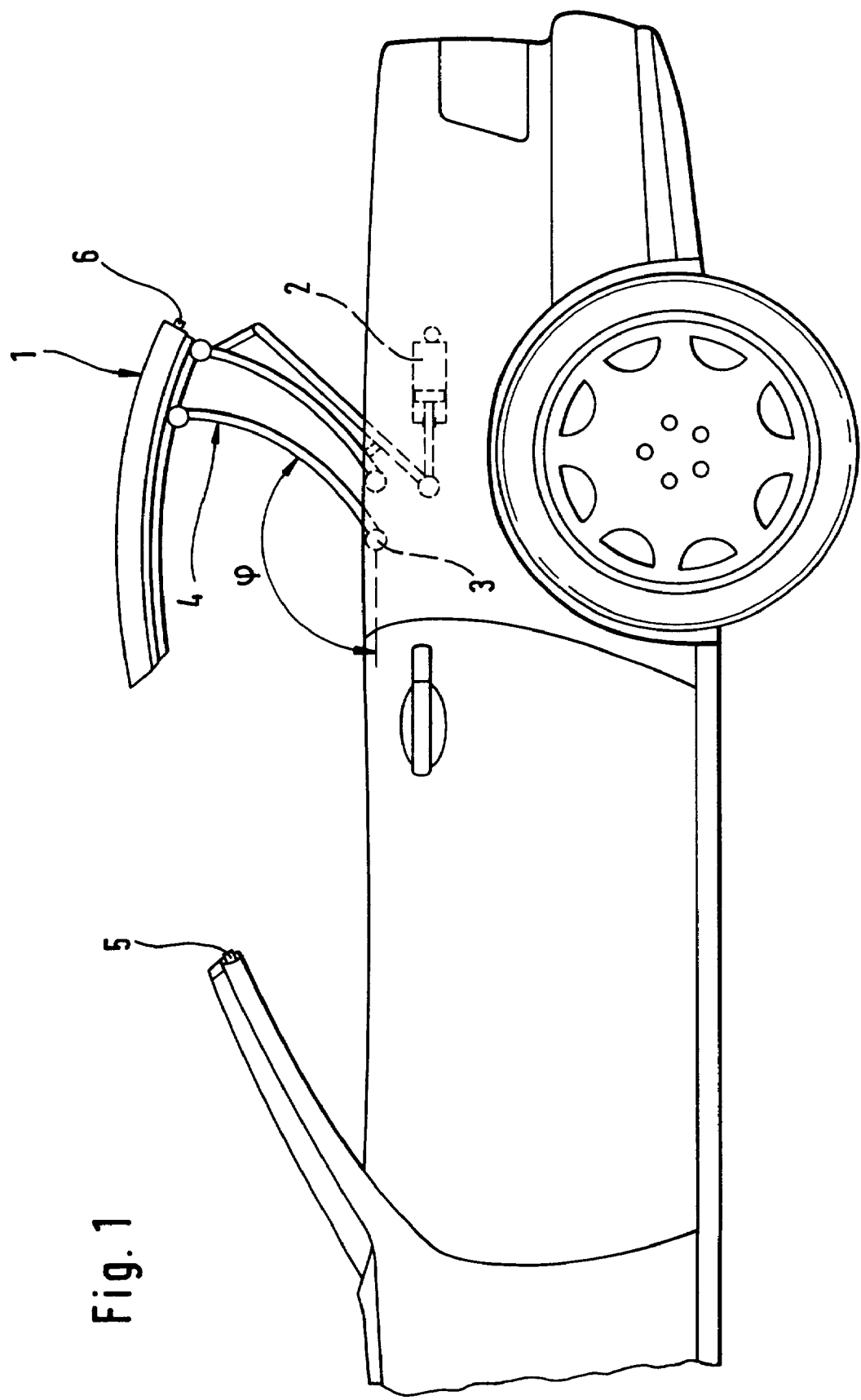
FIG. 1 shows a side view of a motor vehicle with a partly opened folding top.

FIG. 1 shows a rear region of a motor vehicle with a partly opened folding top 1. The folding top 1 has a linkage 4, which can be swiveled by means of a hydraulic motor 2 about a bearing point 3. The hydraulic motor 2 is in this case designed as hydraulic cylinders. Limit switches 5, 6 are arranged on the folding top 1 and on fixed components of the motor vehicle.

Figure 2:
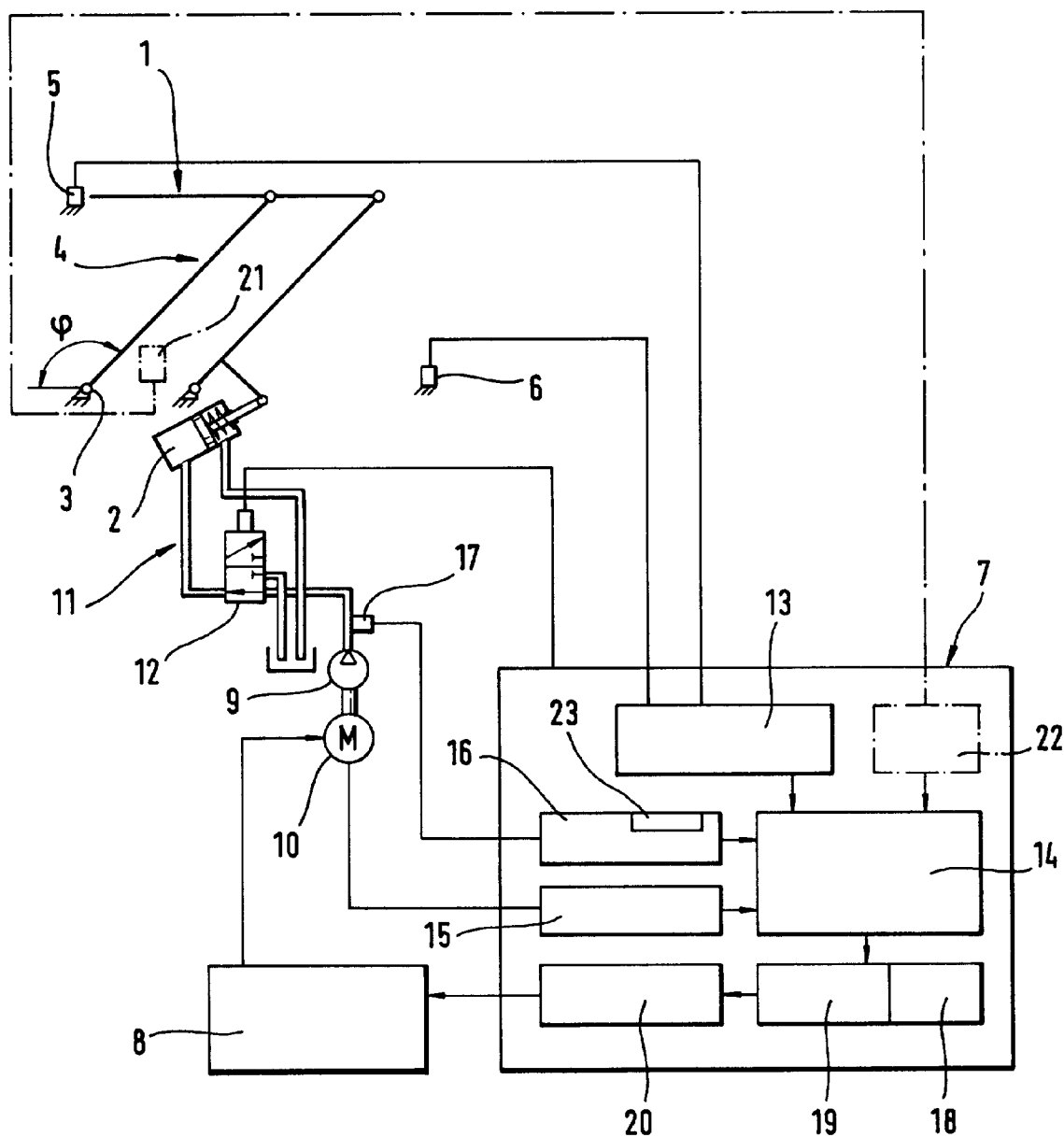
FIG. 2 shows a circuit diagram of an operating mechanism according to the invention for the folding top from FIG. 1.

FIG. 2 shows a circuit diagram of an operating mechanism according to the invention for the folding top 1 from FIG. 1. The operating mechanism has control electronics 7 with an output stage 8 for actuating an electric motor 10 driving a hydraulic pump 9. With a hydraulic pump 9, the hydraulic motor 2 forms a hydraulic gear mechanism 11, which can be switched by a hydraulic valve 12. The hydraulic valve 12 is switched by the control electronics 7 according to an intended direction of movement of the folding top.

When the folding top 1 reaches an intended position, the limit switches 5, 6 send an electric signal to a limit-switch detection means 13 of the control electronics 7. From there, the signal is passed on to a position-detecting unit 14. The rotational speed of the electric motor 10 is detected by a rotational-speed detection means 15 of the control electronics 7 and likewise passed on to the position-detecting unit 14. On the basis of the number of revolutions of the electric motor 10 and the hydraulic efficiency of the hydraulic gear mechanism 11, the swiveling angle φ of the linkage 4 at any given instant can be determined in the position-detecting unit 14 of the control electronics 7. The calculated swiveling angle φ at any given instant is corrected by a compensation element 16 of the control electronics 7 with values from a sensor 17 for the pressure and temperature of the hydraulic medium. In a memory 23 of the compensation element 16, moreover, the average number of revolutions of the electric motor 10 for the movement of the folding top 1 between the positions of the two limit switches 5, 6 is stored. It is consequently possible to sense and compensate for wearing of the hydraulic gear mechanism 11 or of the linkage 4.

The signals of the position-detecting unit 14 are fed to a computing unit 19 connected to an electronic memory 18. Setpoint selections for a rotational speed or a rotational-speed profile for the electric motor 10 according to the position of the folding top 1 are stored in the memory 18. With these values, the output stage 8 of the electric motor 10 is actuated by means of a rotational-speed regulating means 20.

Only two limit switches 5, 6 are represented in the drawing. It goes without saying that it is also possible to use several limit switches. Instead of the calculation of the position of the folding top 1, the swiveling angle φ of the linkage 4 can also be sensed by a sensor 21, represented by dash-dotted lines, and fed to an angle-detecting means 22 arranged upstream of the position-detecting unit 14.

What is claimed is:

1. An operating mechanism for a folding top of a convertible, comprising:

a gear mechanism having a hydraulic pump and a hydraulic motor, the hydraulic mechanism being connected in an articulated manner to the folding top;

a position transmitter for generating electric signals according to positions of the folding top, and control electronics regulating a flow of hydraulic medium of the hydraulic pump for producing an intended sequence of movements of the folding top in response to a sensing of electric signals of the position transmitter;

means for sensing an adjusting angle of a linkage of the folding top, and means responsive to a sensing of the angle by the angle sensing means for determining a volumetric flow of hydraulic medium of the hydraulic pump (9) or a hydraulic output of the hydraulic medium to be regulated by the control electronics (7) in response to the angle of the linkage provided by the sensing means for producing an intended speed of movement of the folding top (1).

2. The operating mechanism as claimed in claim 1, the motor is an electric motor, wherein rotational speed of the electric motor (10) driving the hydraulic pump (9) can be regulated.

3. The operating mechanism as claimed in claim 1, wherein the control electronics (7) have a memory (18) for a plurality of rotational speed or rotational-speed profiles of the motor (10) intended for various positions of the folding top (7).

4. The operating mechanism as claimed in claim 1, wherein an output of the motor (10) driving the hydraulic pump (9) can be regulated.

5. The operating mechanism as claimed in claim 1, wherein a plurality of limit switches sense an actual position of the folding top, each range between two limit switches being assigned a constant rotational speed or constant output of the motor.

6. The operating mechanism as claimed in claim 1, wherein a plurality of limit switches sense an actual position of the folding top, rotational speed of the motor being integrated over time between these positions.

7. The operating mechanism as claimed in claim 1, wherein the control electronics (7) have means for calculating the position of the folding top (1) at any given instant.

8. The operating mechanism as claimed in claim 1, wherein the control electronics (7) are designed for determining position of the folding top (1) at any given instant from number of revolutions of the motor (10) and the volumetric efficiency of hydraulic gear mechanism (11).

9. The operating mechanism as claimed in claim 1, wherein the motor (10) senses angular position or speed of a rotor of the folding top and wherein the control electronics (7) are designed for calculating position of the folding top (1) on the basis of an rotor position or rotor speed.

10. The operating mechanism as claimed in claim 1, wherein the sensing means comprises a sensor (21) for sensing the adjusting angle or adjusting displacement of a linkage (4) of the folding top (1).

11. The operating mechanism as claimed in claim 1, which comprises sensors (17) for pressure and temperature of the hydraulic medium.

12. The operating mechanism as claimed in claim 1, wherein the control electronics (7) have a memory (23) for an average number of revolutions of the motor (10) for a movement of the folding top (1) between two limit switches (5, 6).

* * * * *